United States Patent
Black et al.

(10) Patent No.: US 8,041,467 B2
(45) Date of Patent: Oct. 18, 2011

(54) OPTIMAL DISPATCH OF DEMAND SIDE ELECTRICITY RESOURCES

(75) Inventors: Jason Wayne Black, Clifton Park, NY (US); Ronald Ray Larson, Palm Bay, FL (US); Rajesh Tyagi, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 338 days.

(21) Appl. No.: 12/290,623

(22) Filed: Oct. 31, 2008

(65) Prior Publication Data

US 2010/0114799 A1 May 6, 2010

(51) Int. Cl.
G05D 11/00 (2006.01)
G06F 17/00 (2006.01)
(52) U.S. Cl. .................. 700/291; 700/295; 705/412
(58) Field of Classification Search .............. 713/300, 713/310, 320, 321, 322, 323, 324, 330, 340; 700/286, 287, 288, 289, 290, 291, 292, 295, 700/296, 297, 299, 300; 705/412, 37 R, 26, 7–10, 28, 30, 29

See application file for complete search history.

(56) References Cited

U.S. PATENT DOCUMENTS

| 4,141,069 A * | 2/1979 | Fox ............................... 700/291 |
| 4,771,185 A * | 9/1988 | Feron et al. ..................... 307/39 |
| 5,644,173 A * | 7/1997 | Elliason et al. ................. 307/34 |
| 6,480,803 B1 * | 11/2002 | Pierret et al. .................. 702/130 |
| 7,385,373 B2 | 6/2008 | Doruk et al. ................... 320/107 |
| 2004/0264083 A1 * | 12/2004 | Mansingh et al. .............. 361/62 |
| 2008/0154810 A1 * | 6/2008 | Ye et al. ......................... 706/13 |
| 2008/0177678 A1 * | 7/2008 | Di Martini et al. ........... 705/412 |

* cited by examiner

Primary Examiner — Igor Borissov
(74) Attorney, Agent, or Firm — Ann M. Agosti (57) ABSTRACT

A method of load dispatch generates a load dispatch curve in response to both the opportunity cost of dispatching resources with a contractually limited number of dispatches in a given time period and estimated rebound effect data. The method identifies a best time period for dispatch based on the load dispatch curve and also supply curve data and generates a resultant load dispatch schedule. The resultant load dispatch schedule is transmitted to one or more smart home meters to dispatch loads in a manner that provides the greatest economic benefit.

3 Claims, 7 Drawing Sheets

| DAILY DEMAND | | BASE CASE | | SHED CASE | | | |
|---|---|---|---|---|---|---|---|
| TIME | MW | BASE SUPPLY MW | BASE COST | OPTIMIZED LOAD (MW) | SUPPLY COST | AMT SHED | LOAD CHANGE |
| 1 | 4,000 | 4,000 | 64,000 | 4,000 | 64,000 | 0 | 0 |
| 2 | 4,000 | 4,000 | 64,000 | 4,000 | 64,000 | 0 | 0 |
| 3 | 4,000 | 4,000 | 64,000 | 4,000 | 64,000 | 0 | 0 |
| 4 | 5,000 | 4,000 | 90,000 | 5,000 | 64,000 | 0 | 0 |
| 5 | 6,000 | 6,000 | 126,000 | 6,000 | 126,000 | 0 | 0 |
| 6 | 7,000 | 7,000 | 175,000 | 7,000 | 175,000 | 0 | 0 |
| 7 | 8,100 | 8,100 | 249,480 | 8,100 | 249,480 | 0 | 0 |
| 8 | 8,400 | 8,400 | 278,880 | 8,400 | 278,880 | 0 | 0 |
| 9 | 8,500 | 8,500 | 289,000 | 8,000 | 240,000 | 500 | −500 |
| 10 | 6,500 | 6,500 | 149,500 | 6,700 | 159,460 | 0 | 200 |
| 11 | 6,500 | 6,500 | 149,500 | 6,650 | 156,940 | 0 | 150 |
| 12 | 6,500 | 6,500 | 149,500 | 6,600 | 154,440 | 0 | 100 |
| 13 | 6,500 | 6,500 | 149,500 | 6,500 | 149,500 | 0 | 0 |
| 14 | 8,000 | 8,000 | 240,000 | 8,000 | 240,000 | 0 | 0 |
| 15 | 9,500 | 9,500 | 418,000 | 9,440 | 408,563 | 60 | −60 |
| 16 | 9,600 | 9,600 | 433,920 | 9,124 | 360,289 | 500 | −476 |
| 17 | 9,200 | 9,200 | 374,680 | 8,998 | 341,780 | 420 | −202 |
| 18 | 8,000 | 8,000 | 240,000 | 8,000 | 240,000 | 330 | 0 |
| 19 | 7,000 | 7,000 | 175,000 | 7,358 | 197,121 | 0 | 358 |
| 20 | 6,000 | 6,000 | 126,000 | 6,183 | 134,369 | 0 | 183 |
| 21 | 5,000 | 5,000 | 90,000 | 5,066 | 92,191 | 0 | 66 |
| 22 | 5,000 | 5,000 | 90,000 | 5,000 | 90,000 | 0 | 0 |
| 23 | 5,000 | 5,000 | 90,000 | 5,000 | 90,000 | 0 | 0 |
| 24 | 5,000 | 5,000 | 90,000 | 5,000 | 90,000 | 0 | 0 |
| TOTAL | 158,300 | | | | | | |

| SUPPLY COST | 4,362,960 | 4,256,013 |
|---|---|---|
| SHED AMT | 0 | 1,810 |
| SHED COST | 0 | 27,078 |
| TOTAL COST | 4,362,960 | 4,362,960 |

| TOTAL SAVINGS: | | 79,870 |
|---|---|---|

FIG.8

OPTIMAL DISPATCH OF DEMAND SIDE ELECTRICITY RESOURCES

BACKGROUND

The invention relates generally to demand side electricity resources, and more particularly to a method for integrating demand response into optimal dispatch algorithms for electric power systems.

Existing demand response programs do not capture the impact of shifting/deferring load from one time period to another. When demand is dispatched, the load agrees to reduce consumption for the specified hour(s) according to the demand bid. Once the curtailment period expires, the current programs typically assume that the demand will then return to its "normal" or uncurtailed, baseline state (or at least fail to take the rebound effect into account). In reality, however, many types of demand will actually consume more than their "normal" state following a curtailment event. This increase in subsequent periods can be called a rebound effect.

For deferred/shifted loads, consumption is delayed; and so it should be expected that subsequent periods will see an increase in demand. For some applications, demand is not deferred, but instead foregone completely. Lighting, for example, cannot typically be deferred; and so if turning off lights is part of a curtailment, that load will not rebound. Delaying an industrial process on the other hand, will clearly result in an increase in subsequent load.

For small demand response programs or those with little load deferral, optimal dispatch may safely ignore the rebound effect with little efficiency loss. As demand response programs increase in size and more participation occurs via load shifting, the impacts of the rebound effect will result in greater efficiency losses, and the potential for secondary peaks being created.

Electricity demand can be categorized by demand for power and demand for energy. Demand for power is instantaneous, while demand for energy is not. Energy based demand can be utilized as a storage mechanism for electric power, allowing for short-term substitution between periods. In addition, the services provided by equipment which demands power rather than energy are not time dependent in many cases.

Classifying electricity demand by end use enables an estimation of both the magnitude of and time scales associated with potential demand bidding blocks. Residential demand can be broken down into three categories: Core Demand, Deferrable Demand, and Thermal Demand.

Core demand is defined as the segment of load that is dependent upon real time power delivery. This includes lighting, televisions, computers (not including laptops with rechargeable batteries), and small appliances. The indirect services provided by electricity in these cases are available only as long as power is flowing to the equipment/appliance providing the service. This segment of load is relatively inelastic in the short term because it cannot be deferred. Any curtailments or reductions in core demand will not typically be shifted to a later time period. Core demand has been estimated to account for approximately 36% of the total residential electricity demand.

A second category of electricity demand consists of deferrable load. Deferrable demand is somewhat of a hybrid between power based loads and energy based loads. Although the service provided by these loads depends on continuous power for a fixed period of time, the demand for the service itself is not instantaneous and often consumers may be indifferent to provision of the service within a range of time periods. Washers, dryers, dishwashers, and electric ovens are examples of appliances that have deferrable load. Consumers often are not concerned with the exact times that such appliances run, as long as it is within a certain interval. Consumers will often be willing to delay the use of these appliances for several hours without loss of consumer benefit from the service, especially if the delay can be automated by the use of timer controls. This presents an opportunity for deferring the power consumption by these appliances from peak to off peak time periods—especially if programmable controls are available to automate the deferral. Although these appliances typically make up a small portion of the total residential load due to their intermittent usage, they do consume significant amounts of power while running and therefore offer the potential for significant peak shaving whenever they can be shifted to off peak consumption. Slightly less than 10% of the total residential electricity demand has been estimated to consist of deferrable load. Commercial and industrial customers may also defer certain processes from a given time period to another.

The final category of demand is thermal demand, and it consists of air conditioners, refrigerators, water heaters, and electric space heaters. These provide service based on thermal transfer (heat or cooling). As such, consumers are indifferent to the actual time that this equipment runs, as long as the temperature remains within a certain range. By intelligently controlling consumption of energy based loads, the desired temperature band can be utilized as a thermal storage medium, and therefore as an indirect electricity storage method. The time scales for deferring thermal demand are typically on the order of 1-4 hours, thus creating a large potential for a rebound effect when dispatched as part of a demand response program.

Thermal loads can also be pre-heated or pre-cooled during low priced periods or activated/deactivated on a shorter time period in response to changes in system conditions. Thermal load has been estimated to account for nearly 50% of total residential consumption. It is also a significant portion of commercial and industrial demand. This represents a very large potential for load shifting in order to reduce peak demand by utilizing thermal storage. Air conditioning has been estimated to account for over 20% of household electricity usage in the United States. Air conditioning load is also highly peak coincident, since summer peaks are almost entirely caused by air conditioning load. Residential and commercial air conditioning load have been estimated to represent at least 30% of the summer peak electricity loads.

Core demand is instantaneous and inelastic. Core loads require continuous power in order to maintain their services and represent a little over one third of total residential demand. Deferrable loads require power to provide their services, but the demand for those services is not instantaneous. This presents the potential to defer the energy consumption in response to system conditions, such as price or contingencies. Deferrable load has been estimated to consist of less than 10% of total residential demand. The final category, thermal demand, consists of thermal based services that require energy rather than instantaneous power. Over 50% of residential demand can be classified as thermal demand.

It is likely that as demand response programs expand to include more residential customers, thermal and deferrable demand will be the predominant means of residential participation. Due to the nature of this type of demand, this will create a large potential for a rebound effect in subsequent hours after demand is dispatched. This will increase the need for a demand dispatch methodology that includes the rebound effect.

Many existing Demand Response programs have a limit to the number of times that a participating customer may be dispatched (i.e. called upon to respond) within a given time period. For example, a residential customer's air conditioning load may be reduced up to 10 times per year.

In view of the foregoing, it would be advantageous to provide a system and method for integrating demand response into optimal dispatch algorithms for electric power systems that includes the rebound effect. It would also be beneficial if the system and method were to include the opportunity cost of dispatching resources with a contractually limited number of dispatches in a given time period.

BRIEF DESCRIPTION

Briefly, in accordance with one embodiment, a load dispatch system is configured to operate in response to algorithmic software to generate an optimized load dispatch schedule based on data selected from one or both of rebound effect data or optimized load dispatch schedule opportunity cost data corresponding to dispatching of resources.

According to another embodiment, a load dispatch system comprises:

a load dispatch optimization module; and algorithmic software directing the load dispatch optimization module to generate a load dispatch signal based on one or both rebound effect data and contractually limited event data.

According to yet another embodiment, a method of load dispatch comprises:

generating a load dispatch curve in response to dispatch availability by block data;

identifying a best period for dispatch based on the load dispatch curve and supply curve data; and updating a load forecast based on the best period for dispatch and rebound effect estimation data.

DRAWINGS

These and other features, aspects, and advantages of the present invention will become better understood when the following detailed description is read with reference to the accompanying drawings in which like characters represent like parts throughout the drawings, wherein.

While the above-identified drawing figures set forth alternative embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION

The embodiments described herein are directed to inclusion of the rebound effect when dispatching demand resources. Since the time scales for many demand response implementations are on the order of hours, once a demand resource ahs been dispatched, it is not only likely unavailable for re-dispatch during the same day, but it is also likely that the dispatched demand will actually increase in subsequent hours or time periods. A significant rebound component may thus contribute to demand response for load shifting applications such as those associated with air conditioning.

Further, many demand response programs offer contracts to participants that limit the number of demand response events, e.g. interruptions/curtailments or critical peak pricing events over a given time period, e.g. monthly, annual, etc. It may be necessary to compare the economic benefits associated with dispatch during the current period of interest versus the likelihood of achieving greater benefits in future periods when dispatching demand resources with such contract provisions.

System and method embodiments described herein allow optimal usage of limited demand response events over the course of a contract period to provide a tradeoff between current and future periods. An optimization technique according to one aspect provides a target result between about 0% and about 100% of available demand resources that may be utilized in the current period.

Figure 1:
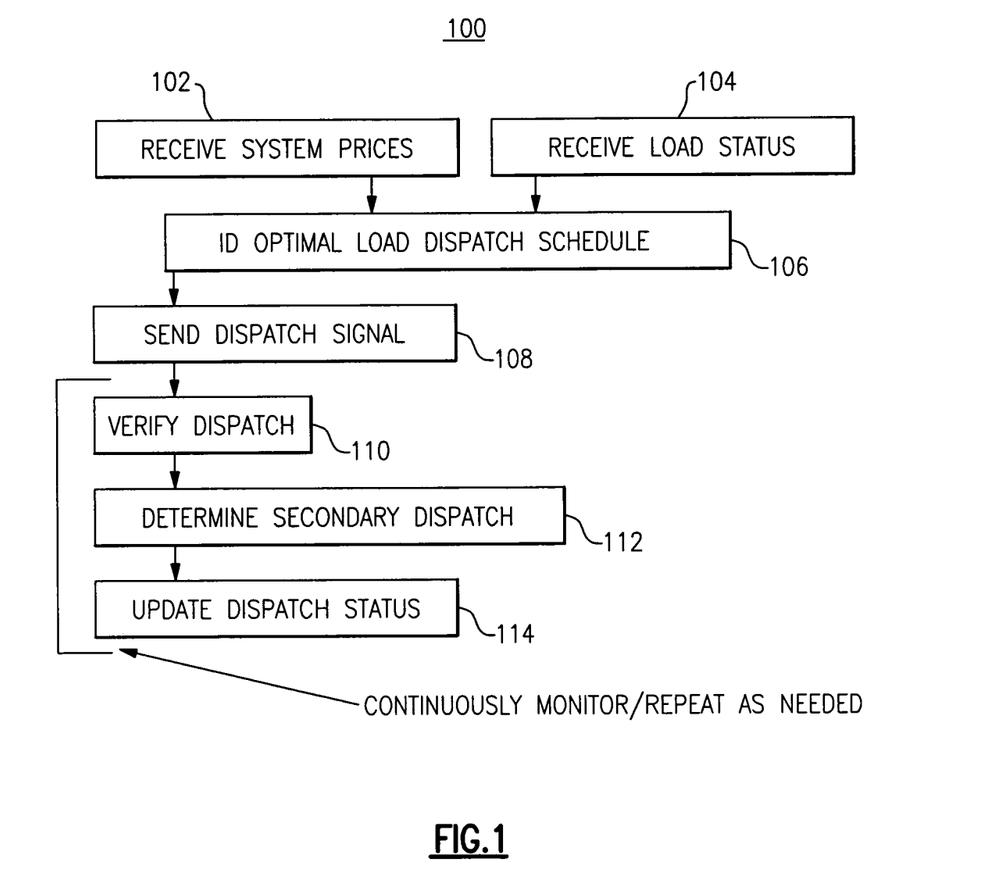
FIG. 1 is an economic dispatch load process diagram according to one embodiment of the invention.

Looking now at FIG. 1, an economic dispatch of load process 100 is shown according to one embodiment of the invention. The dispatch of load process 100 commences by identifying an optimal load dispatch schedule 106 in response to system prices as represented in block 102 that can be associated with single or multiple time periods, and also in response to load status as represented in block 104 that may include, without limitation, load availability, cost of shed/response, duration of response, rebound effect, opportunity cost of dispatching resources with a limited number of dispatches in a given time period, and so on.

A dispatch signal as represented in block 108 corresponding to the identified load dispatch schedule 106 is then verified as represented in block 110. This verification process may be implemented by using, without limitation, a predetermined baseline that may be based on historical data, a last meter read based on up-to-date meter readings, or a direct verification/override signal.

A secondary dispatch schedule may be determined, if desired or necessary, based on override signals, as shown in block 112. A resultant dispatch status update signal, as represented in block 114, then updates, without limitation, contract status data, billing data, available resource data, and load forecast data. Load dispatch verification and updating as shown in blocks 110-114 is repeated as necessary to achieve a desired process result.

Figure 2:
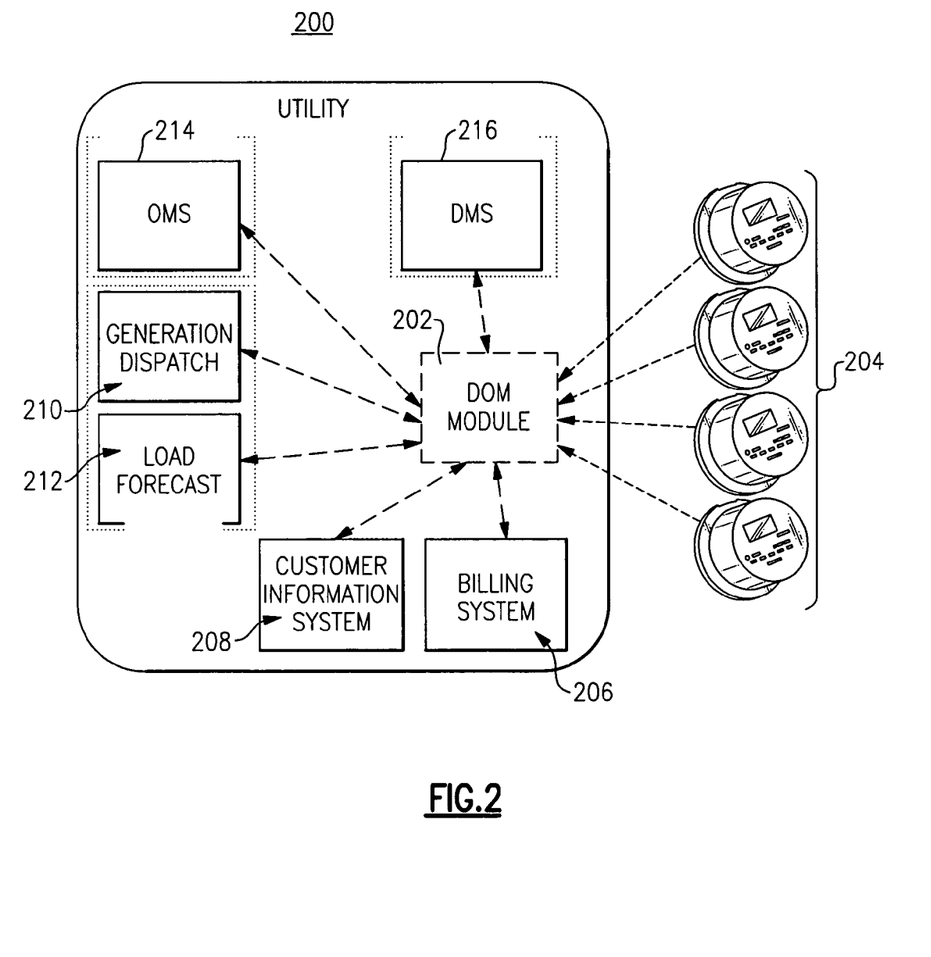
FIG. 2 illustrates a load dispatch module interface system according to one embodiment of the invention.

FIG. 2 illustrates a high level load dispatch interface system 200 according to one embodiment of the invention. Load dispatch interface system 200 includes a dispatch optimization module (DOM) 202 that operates in a similar fashion as described with reference to FIG. 1 to provide for economic dispatch of load(s). The DOM module 202 communicates with load meters 204, a billing system 206, a customer information system 208 that may provide, for example, contract status information that may indicate, without limitation, the number of limited power interruptions that have been used, a generation dispatch system 210 that determines which power points are active including corresponding power output levels to yield a supply curve, a load forecast system 212 that operates at the utility control level, an outage management system 214 that ensures system stabilization following a power outage, and a distribution management system (DMS) 216 that may operate, for example, at a city or town level.

Figure 3:
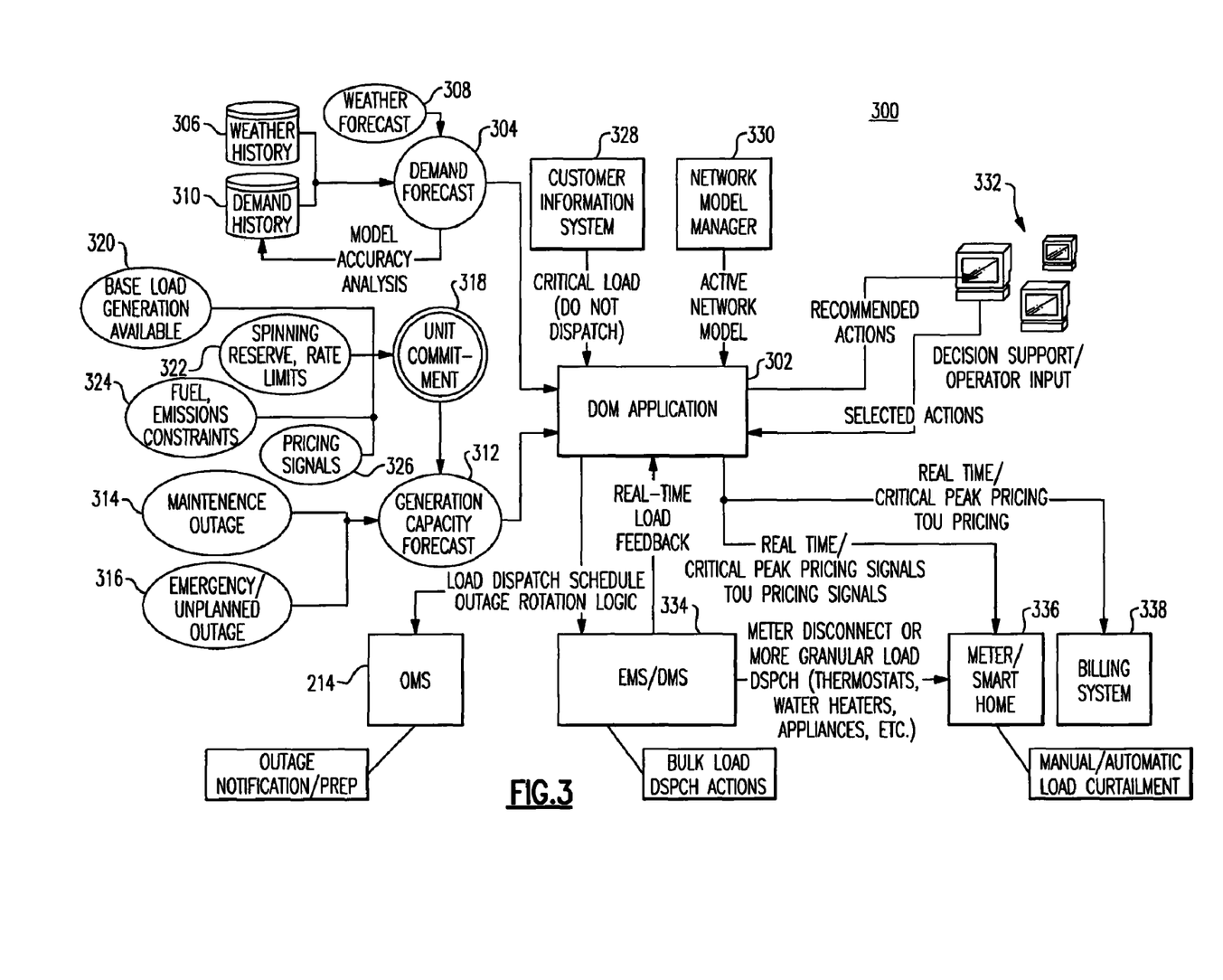
FIG. 3 illustrates a high level data flow diagram associated with the load dispatch module interface system depicted in FIG. 2, according to one embodiment of the invention.

FIG. 3 illustrates a high level data flow diagram 300 associated with the load dispatch interface system 200 depicted in FIG. 2, according to one embodiment of the invention. A dispatch optimization module (DOM) application 302 employs algorithmic software described in further detail below that directs operation of the DOM 202 depicted in FIG. 2, using demand forecast data 304 that may include, without limitation, weather history data 306, weather forecast data 308, and demand history data 310.

DOM application 302 also may operate in response to generation capacity forecast data 312. The generation capacity forecast data 312 may include, without limitation, maintenance outage data 314, emergency/unplanned outage data 316, and unit commitment data 318. The unit commitment data 318 may include, without limitation, base load generation available data 320, spinning reserve, and rate limit data 322, fuel emissions and constraints data 324, and pricing data 326. Other data that may be used in the DOM application 302 may include, without limitation, customer information system data 328 and network model manager data 330.

A decision support/operator input system 332 operates to monitor the DOM application 302 status and provide further dispatch commands that may be desired or deemed necessary to achieve a desired result. DOM application 302 commands are then generated in response to the foregoing input data to provide bulk load shed actions to be implemented via an energy management system (EMS)/distribution management system (DMS) 334 and also to provide load outage scheduling via an outage management system (OMS) 214. DOM application 302 may also generate real time/critical peak pricing signals and time of use pricing signals for use by, for example, intelligent metering 336 and a billing system 338. The intelligent metering 336 may be associated with a smart home metering system, for example, to manually or automatically curtail load use. EMS/DMS 334 may operate as a disconnect associated with the intelligent metering 336 or may provide more granular load dispatches associated with, for example, thermostats, water heaters, appliances, and so on.

Figure 4:
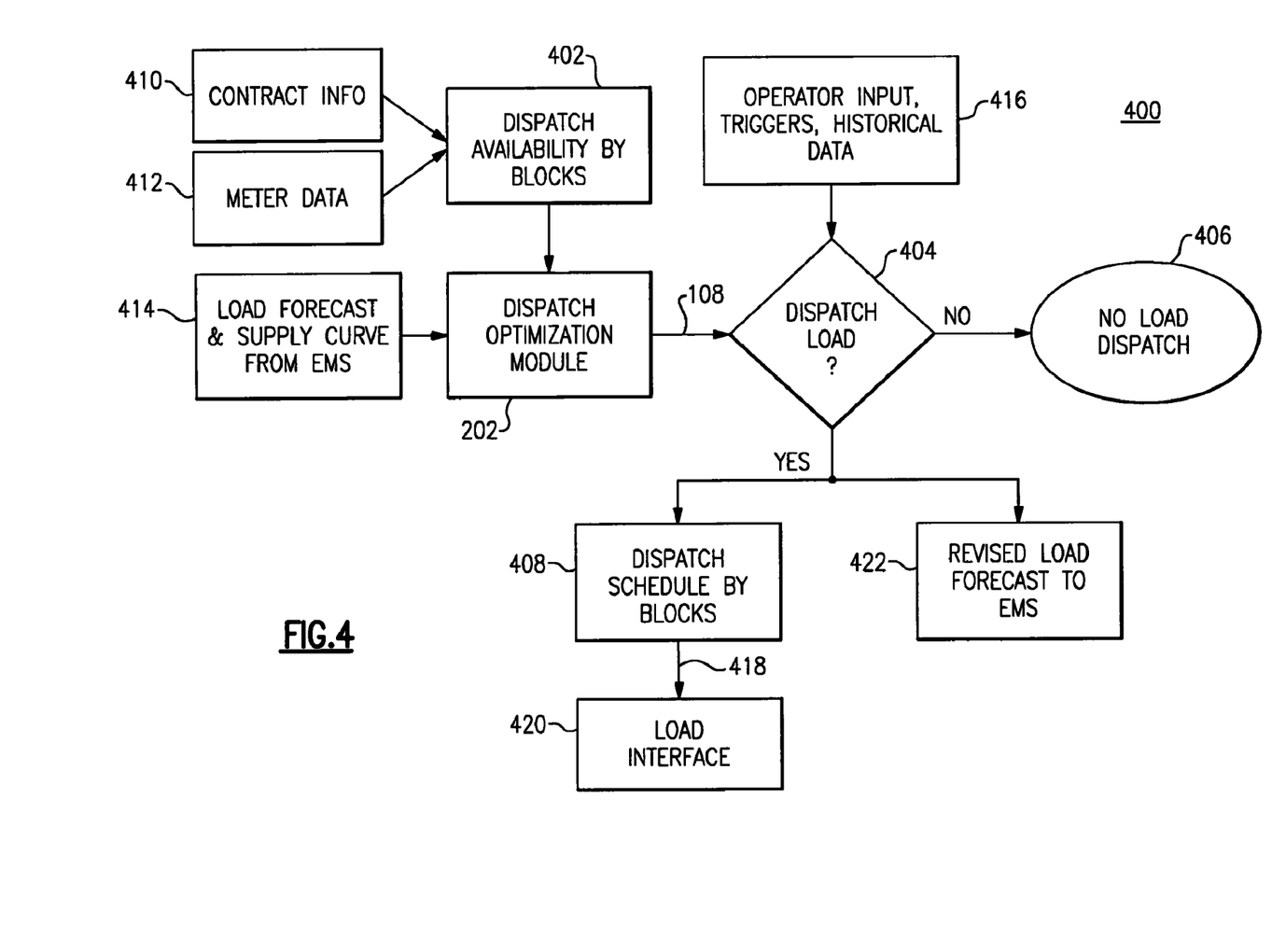
FIG. 4 illustrates a load dispatch optimizer process flow diagram according to one embodiment of the invention.

FIG. 4 illustrates a load dispatch optimizer process flow diagram 400 according to one embodiment of the invention. Load dispatch decisions generated via the programmable load dispatch optimization module 202 are determined in part by a load dispatch optimization algorithm described in further detail below with reference to FIG. 5 that is responsive to, without limitation, rebound effect data and opportunity cost data associated with dispatching resources with a limited number of dispatches in a given time period. The process 400 may be implemented according to one embodiment, as one portion of DOM application 302 described above with reference to FIG. 3.

The dispatch optimization module 202 receives dispatch block availability data 402 determined from contract information 410 and meter data 412. The contract information 410 may include contractually limited number of events data according to one aspect of the invention. The meter data 412 may include rebound effect data according to another aspect of the invention.

Dispatch optimization module 202 also receives load forecast and supply curve data 414. The load forecast data may also include rebound effect data according to one aspect of the invention. The load dispatch optimization module 202 operates in response to the programmed dispatch optimization algorithm described in further detail below with reference to FIG. 5, to generate a dispatch signal 108 that is based on the contract information 410, and/or meter data 412, and/or load forecast and supply curve data 414. The dispatch signal 108 may be further determined in response to the rebound effect that may be included as one portion of the load forecast and/or also in response to the limited number of events data that may be included as one portion of the contract information 410, meter data 412, and/or load forecast and supply curve data 414.

A decision based on the dispatch signal 108 and also based on additional data 416 such as historical data and/or data provided by a system operator and/or predetermined trigger event data determines whether a load dispatch does or does not occur, as represented in block 404. A decision may result in no load dispatch 406 or a load block dispatch 408. The block load dispatch signal(s) 418 may be transmitted to a load interface 420 that is one portion of the EMS/DMS 334 depicted in FIG. 3 to implement the requested block load dispatch. A revised load forecast will simultaneously be transmitted to the supplier, as represented in block 422, allowing the supplier to generate an updated load forecast and supply curve, as represented in block 414.

Figure 5:
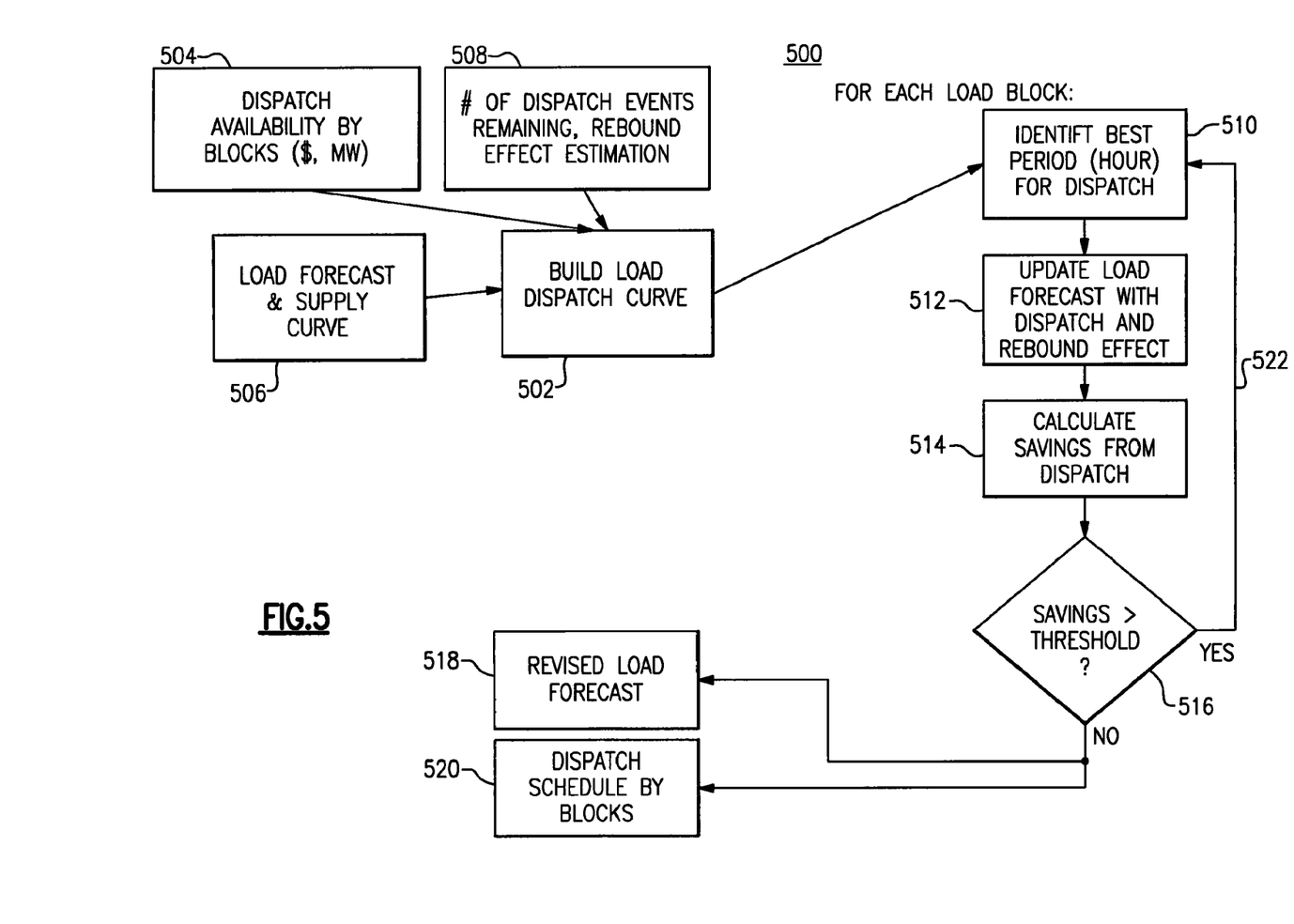
FIG. 5 is a flow chart illustrating a method of optimizing load dispatch according to one embodiment of the invention.

FIG. 5 is a flow chart illustrating an algorithmic method 500 of optimizing load dispatch according to one embodiment of the invention. Method 500 may be implemented via algorithmic software that is embedded within dispatch optimization module 202 that is programmable according to one embodiment, or otherwise communicated to the DOM 202 via an operator input 332 such as depicted in FIG. 3. The algorithmic software directs the load dispatch optimization module 202 according to one aspect using algorithmically defined relationships between load forecast data, supply data, and data selected from rebound effect data and/or opportunity cost data corresponding to dispatching of resources with a contractually limited number of dispatch events. These algorithmically defined relationships are easily determined and generated for a particular application using existing programming techniques familiar to those skilled in the art of dispatching demand resources; and so further details are excluded herein to preserve brevity and enhance clarity in understanding the embodiments described herein.

The method of load dispatch commences according to one aspect by developing a load dispatch curve as represented in block 502. The load dispatch curve may be based on data that can include without limitation, load dispatch availability by blocks 504 that may be a function of cost and/or power/energy consumption level(s) i.e. dollars per megawatt hour. The load dispatch curve may further be based on load forecast and/or supply curve data 506. Data corresponding to the number of contractually remaining dispatch events and/or an estimated rebound effect 508 may also used to build the load dispatch curve 502. The term curve as used herein also means graph, plot, or other similar relationship between the data 504, 506, 508. Further the relationship between the data 504, 506, 508 may or may not result in a curve, but may result in a different type of relationship such as, without limitation, a linear relationship.

A best time period for load dispatch is determined from the load dispatch curve 502 as represented in block 510. Following identification of any best time period(s) for load dispatch, the load dispatch response is then updated taking into consideration the estimated rebound effect and/or number of dispatch events remaining as represented in block 512. Any cost savings resulting from use of the updated load forecast is then determined as represented in block 514. If the savings determined in step 514 exceeds a predetermined threshold as represented in decision block 516, then the foregoing process represented by blocks 510, 512, and 514 is repeated until the savings determined in step 514 does not exceed the predetermined threshold.

The foregoing process 500 is iterative beginning with the lowest cost load block according to one aspect of the invention. The saving threshold may be calculated, for example, as the least amount of savings on a dollar per megawatt hour basis that is acceptable. The threshold is zero if there is no limit to the number of dispatches. The threshold is based on the expected value of saving the dispatch for a future period if there are a limited number of dispatches. This value is estimated on data such as historical price data and weather information.

The calculated savings may include any reduction in generation costs from the new load forecast based on the supply curve and costs of dispatching any load portion of the load block(s). The savings includes the rebound effect since the load forecast has been updated to reflect the rebound effect.

The iterative loop 522 continues through each load block until the savings is no longer greater than the predetermined threshold. At that point, all previously identified blocks will be dispatched as represented in block 520. The update load forecast step 512 will also be rolled back to the last accepted dispatch schedule once a load block is identified that does not meet the threshold criteria, as represented in block 518.

In summary explanation, a system and method for integrating demand response into optimal dispatch algorithms for electric power systems includes the rebound effect according to one aspect of the invention. The system and method may also include the opportunity cost of dispatching resources with a limited number of dispatches in a given time period according to another aspect of the invention. The system and method embodiments described herein develop a best tradeoff between supply cost and dispatch cost over a given planning horizon in accordance with load dispatch opportunities provided for in customer contracts. The decision variables may include, without limitation, the amount of load to be dispatched in each period, and are subject to demand constraints, rebound constraints, contractual constraints, maximum period dispatch constraints, supply cost schedule, and dispatch cost schedule. A load dispatch algorithm associated with the system and method provides a marginal saving analysis.

Figure 6:
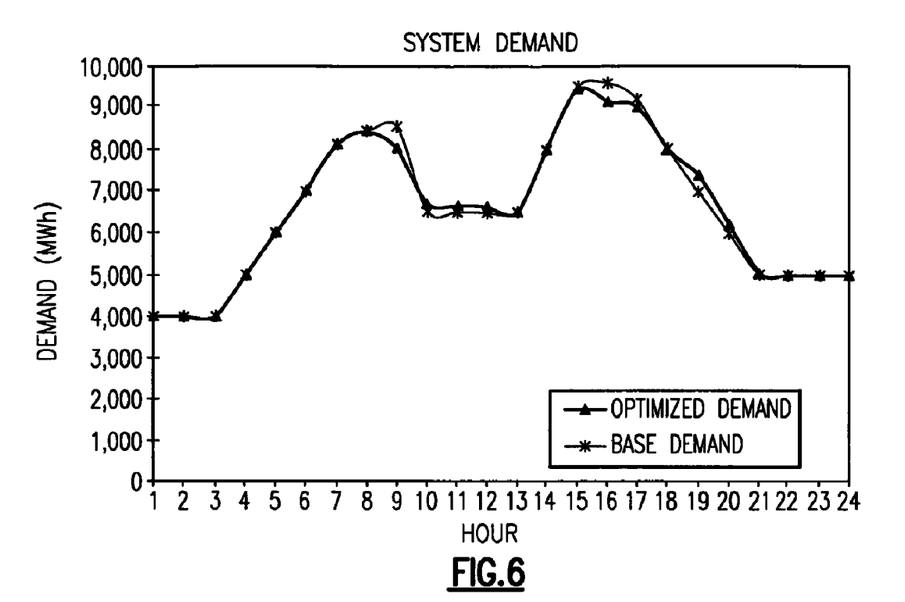
FIG. 6 is a simulated graphical plot illustrating an optimized demand response curve as compared to a base demand response curve according to one embodiment of the invention.

FIG. 6 is a simulated graphical plot illustrating an optimized demand response curve as compared to a base demand response curve according to one embodiment of the invention that includes the rebound effect as well as the opportunity cost of dispatching resources with a contractually limited number of dispatches in a given time period.

Figure 7:
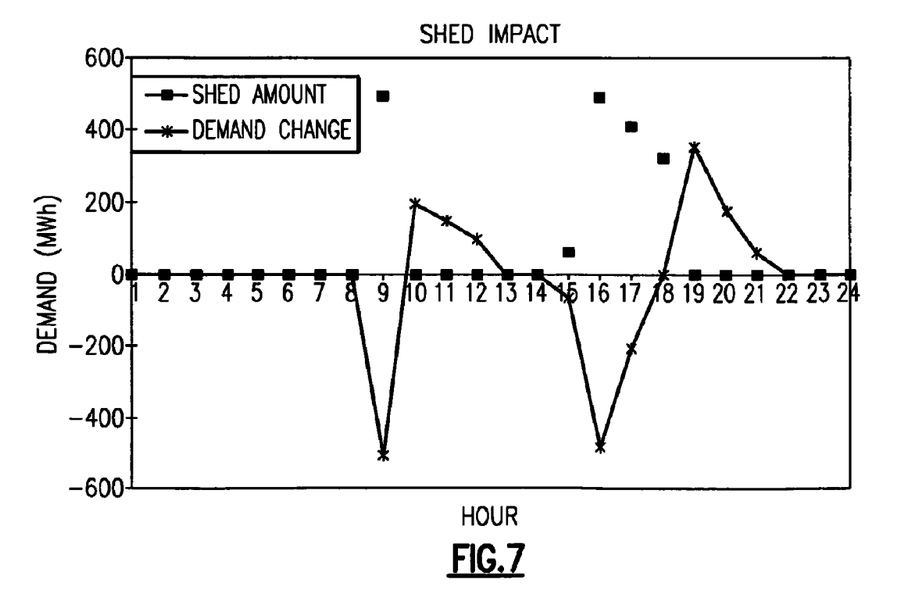
FIG. 7 is a simulated graphical plot illustrating a change in demand in response to load shedding corresponding to the optimized demand response and base demand response curves depicted in FIG. 6.

FIG. 7 is a simulated graphical plot illustrating a change in demand in response to load shedding corresponding to the optimized demand response and base demand response curves depicted in FIG. 6.

Figure 8:
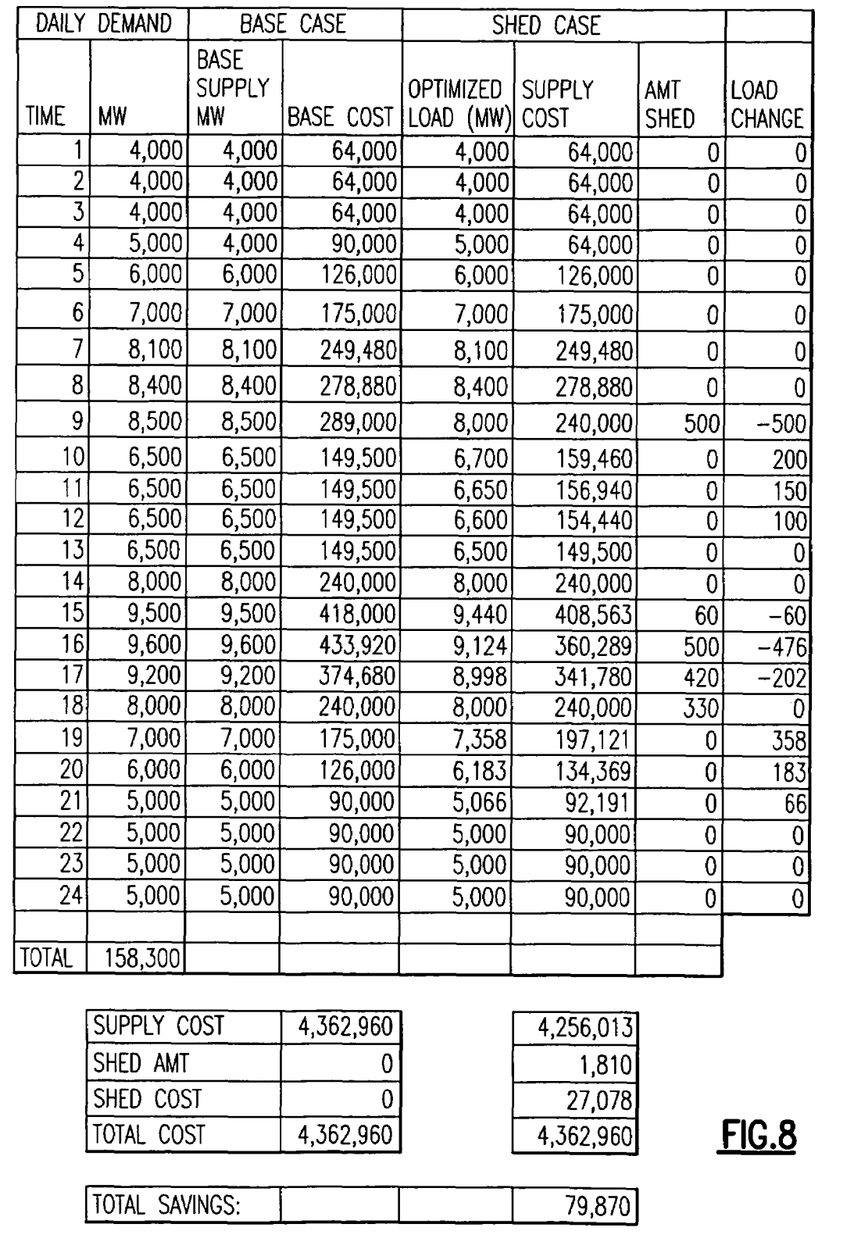
FIG. 8 is a table illustrating a savings benefit attributable to the simulated optimized demand response curve illustrated in FIG. 6.

FIG. 8 is a table illustrating a savings benefit attributable to the simulated optimized demand response curve illustrated in FIG. 6.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of load dispatch, the method comprising:
generating supply curve data by a generation dispatch data processing system;
generating a load dispatch curve a load forecast data processing system in response to both the opportunity cost of dispatching resources with a contractually limited number of dispatches in a given time period and estimated rebound effect data, wherein the estimated rebound effect data is based upon at least one of thermal loads and deferrable loads and further wherein rebound effect is defined as the increase in demand consumption above that experienced by at least one of the thermal loads and deferrable loads during normal operating condition;
identifying by a dispatch data processing module executed by a processor, a time period for dispatch based on the load dispatch curve generated by the load forecast data processing system and supply curve data generated by the generation dispatch data processing system;
generating a load dispatch schedule by the dispatch data processing module executed by the processor based on the time period identified by the dispatch data processing module executed by the processor;
transmitting the load dispatch schedule to one or more smart home meters; and
dispatching loads by one or more smart home meters in response to the load dispatch schedule generated by the dispatch data processing module executed by the processor to provide the lesser of costs associated with load dispatch during the current period of interest when dispatching demand resources with the contractually limited number of dispatches as calculated by the dispatch data processing module executed by the processor versus expected costs associated with load dispatch during future periods when dispatching demand resources with the contractually limited number of dispatches as calculated by the dispatch data processing module executed by the processor.

2. The method according to claim 1, further comprising:
transmitting savings amount information to a display monitor for use by an operator to monitor the savings amount, wherein the savings amount is based on both of a reduction in supply generation costs corresponding to the load forecast and an increase in load dispatch costs corresponding to the load dispatch schedule.

3. The method according to claim 2, further comprising:
dispatching a load block only when the savings amount is greater than a savings threshold, wherein the savings threshold is based on the contractually limited number of dispatches.

* * * * *

UNITED STATES PATENT AND TRADEMARK OFFICE
CERTIFICATE OF CORRECTION

PATENT NO. : 8,041,467 B2  
APPLICATION NO. : 12/290623  
DATED : October 18, 2011  
INVENTOR(S) : Black et al.

It is certified that error appears in the above-identified patent and that said Letters Patent is hereby corrected as shown below:

On the Title Page, in the Figure, for Tag "510", in Line 1, delete "IDENTIFT" and insert -- IDENTIFY --, therefor.

In Fig. 3, Sheet 3 of 7, delete "DSPCH" and insert -- DISPATCH --, at each occurrence in figure 3.

In Fig. 5, Sheet 5 of 7, for Tag "510", in Line 1, delete "IDENTIFT" and insert -- IDENTIFY --, therefor.

In Column 4, Line 14, delete "ahs" and insert -- has --, therefor.

In Column 8, Line 14, in Claim 1, delete "curve" and insert -- curve by --, therefor.

Signed and Sealed this  
Sixth Day of December, 2011

David J. Kappos  
*Director of the United States Patent and Trademark Office*